US010093868B1

(12) United States Patent
Weers et al.

(10) Patent No.: US 10,093,868 B1
(45) Date of Patent: Oct. 9, 2018

(54) IONIC LIQUID-BASED HYDROGEN SULFIDE AND MERCAPTAN SCAVENGERS

(71) Applicant: Baker Hughes, a GE company, LLC, Houston, TX (US)

(72) Inventors: Jerry J. Weers, Richmond, TX (US); Henry Nguyen, Houston, TX (US); Weldon J. Cappel, Tomball, TX (US); Kimchi T. Phan, Katy, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 15/814,114

(22) Filed: Nov. 15, 2017

(51) Int. Cl.
*B01D 15/08* (2006.01)
*B01J 20/22* (2006.01)
*C10G 25/00* (2006.01)

(52) U.S. Cl.
CPC ........... *C10G 25/003* (2013.01); *B01D 15/08* (2013.01); *B01J 20/22* (2013.01); *B01D 2252/2041* (2013.01); *B01D 2252/20405* (2013.01); *C10G 2300/104* (2013.01); *C10G 2300/1044* (2013.01); *C10G 2300/1048* (2013.01); *C10G 2300/202* (2013.01); *C10G 2300/207* (2013.01); *C10G 2400/02* (2013.01); *C10G 2400/04* (2013.01)

(58) Field of Classification Search
None
See application file for complete search history.

(56) References Cited

U.S. PATENT DOCUMENTS

| | | | |
|---|---|---|---|
| 4,147,212 A | 4/1979 | Tisdale | |
| 4,202,882 A | 5/1980 | Schwartz | |
| 4,808,765 A | 2/1989 | Pearce et al. | |
| 5,183,560 A | 2/1993 | Roof et al. | |
| 5,284,576 A | 2/1994 | Weers et al. | |
| 5,443,698 A | 8/1995 | Mahoney et al. | |
| 5,840,177 A | 11/1998 | Weers et al. | |
| 6,013,175 A | 1/2000 | Weers et al. | |
| 6,599,472 B1 | 7/2003 | Hudson | |
| 6,666,975 B1 | 12/2003 | Chen et al. | |
| 8,075,803 B2 | 12/2011 | Kalb et al. | |
| 8,246,813 B2 | 8/2012 | Compton et al. | |
| 8,679,203 B2 | 3/2014 | O'Brien et al. | |
| 8,778,172 B2 | 7/2014 | Subramaniyam | |
| 8,975,208 B2 | 3/2015 | Long et al. | |
| 9,068,269 B2 | 6/2015 | Keenan et al. | |
| 9,334,182 B2 | 5/2016 | Janak | |
| 9,394,617 B2 | 7/2016 | Hall et al. | |
| 2006/0189499 A1* | 8/2006 | Hecht | C07C 409/40 510/320 |
| 2011/0113680 A1 | 5/2011 | O'Brien et al. | |
| 2013/0118996 A1 | 5/2013 | Kaplan | |
| 2014/0166282 A1 | 6/2014 | Martinez et al. | |
| 2014/0166289 A1 | 6/2014 | Martinez et al. | |

OTHER PUBLICATIONS

Hallett, Jason P., et al., "Room-Temperature Ionic Liquids: Solvents for synthesis and Catalysis. 2", Chem. Rev., 2001, 111, 3508-3576.
Amarasekara, Ananda A., "Acidic Ionic Liquids", Chem. Rev., 2016, 116, 6133-6183.
Selva, Maurizio, et al., "Ionic liquids as transesterification catalysts: applications for the synthesis of linear and cyclic organic carbonates", Beilstein Journal of Organic Chemistry, 2016, 12, 1911-1924.
Taylor, Grahame N., et al., "Gas Chromatography Mass Spectrometric Analysis of Chemically Derivatized Hexahydrotriazine-Based Hydrogen Sulfide Scavengers: 1", Ind. Eng. Chem. Res., 2010, 49, 5977-5980.
Taylor, Grahame N., et al., "Gas Chromatography Mass Spectrometric Analysis of Chemically Derivatized Hexahydrotriazine-Based Hydrogen Sulfide Scavengers: Part II", Ind. Eng, Chem. Res., 2010, 49, 6267-6269.
Sharma, M.M., "Absorption of carbonyl sulphide in amines and alkalis", Chemical Engineering Science, 1964, 19, 991-992.
Shu, Chenhua, et al., "A novel process for gasoline desulfurization based on extraction with ionic liquids and reduction by sodium borohydride", Fuel, 121, 2014, 72-78.
Shurong, Gao, et al., "Desulfurization of fuel oils" Mutual solubility of ionic liquids and fuel oil, Fuel, 173, 2016, 164-171.
Yu, Fengli, et al., "Energy-efficient extractive desulfurization of gasoline by polyether-based ionic liquids", Fuel, 177, 2016, 39-45.
Laredo, Georgina, C., et al., "Synthesis of ionic liquids and their use for extracting nitrogen compounds from gas oil feeds towards diesel fuel production", Fuel Processing Technology, 130, 2015, 38-45.
Ghandi, Khashayar, "A Review of Ionic Liquids, Their Limits and Applications", Green and Sustainable Chemistry, 2014, 44-53.
Weisshaar, Duane E., et al., "Investigation of the Stability of Quaternary Ammonium Methyl Carbonates", J. Surfact. Detert., 15, 2012, 199-205.
Kissel, Charles, L., et al., "Factors Contributing to the Ability of Acrolein to Scavenge Corrosive Hydrogen Sulfide", SPE 11749, Oct. 1985, 647-655.
Schieman, Susan R., "Solids-Fee H2S Scavenger Improves Performance and Operational Flexibility", SPE 50788, 1999, 1-3.

(Continued)

*Primary Examiner* — Tam M Nguyen
(74) *Attorney, Agent, or Firm* — Mossman, Kumar & Tyler, P.C.

(57) ABSTRACT

Treatment of hydrocarbon streams, e.g. gasoline, with basic ionic liquids (ILs), results in reduction of the sulfur compounds such as $H_2S$ thiophenes, disulfides, thioethers, and/or mercaptans that are present to remove these compounds. The IL is a quaternary ammonium compound having the formula $R_4N^+$ $X^-$ or $X^-$ $R_3N^+R'N^+R_3$ $X^-$, where R is independently an alkyl group, an alkylbenzyl group, a hydroxyalkyl group, or a hydroxyalkylbenzyl group, and R is straight or branched and has 1-22 carbon atoms, R' is a straight or branched alkylene or oxyalkylene having 1 to 10 carbon atoms, and where $X^-$ can be hydroxide, carbonate, alkylcarbonate, bicarbonate or alkoxide, where the alkyl group of the alkylcarbonate or alkoxide, if present, is straight or branched and has 1 to 8 carbon atoms. The ILs can be used in applications where liquid or gaseous hydrocarbon fluids are treated by direct injection or by extraction.

20 Claims, No Drawings

(56) References Cited

OTHER PUBLICATIONS

Arensdorf, Joseph, et al., "Treatment of Mercaptans in Canadian Condensate", SPE 141217, 2011, 1-4.
Owens, Thomas R., et al,. "Triazine Chemistry: Removing H2S and Mercaptans1", ASRL Quarterly Bulletin No. 155, vol. XLVII, No. 3, 2010, 1-21.
Taylor, G.N., et al., "Fresh Insight into the H2S Scavenging Mechanism of MEA-Triazine vs. MMA-Triazine", SPE184529-MS, Jan. 10, 2017.
Guo, Bin, et al., "Absorption and Oxidation of H2S in Caprolactam Tetrabutyl Ammonium Bromide Ionic Liquid", Energy Fuels, 25, 2011, 159-161.
Malisoff, William Marias, et al., "A Study of Mercaptan Chemistry", Chemical Reviews, vol. VII 4, 1930, 493-547.

\* cited by examiner

IONIC LIQUID-BASED HYDROGEN SULFIDE AND MERCAPTAN SCAVENGERS

TECHNICAL FIELD

The present invention relates to the removal of sulfur compounds from hydrocarbon streams, and more particularly relates, in one non-limiting embodiment, to methods for removing sulfur compounds from a hydrocarbon streams using basic ionic liquids.

TECHNICAL BACKGROUND

Sulfur, generally in the nature of hydrogen sulfide ($H_2S$) and/or organosulfur molecules, is an undesirable contaminant in many hydrocarbon streams. In particular it is desirable to utilize scavengers to remove $H_2S$ or mercaptans from fuels containing hydrocarbon molecules having C1-C12.

Additives currently used to reduce sulfur content only work on inorganic forms of sulfur (mainly hydrogen sulfide, $H_2S$) or low molecular weight (C1-C4) mercaptans. To remove high molecular weight (C5+) mercaptans, disulfides, thioethers and other sulfur compounds, the literature suggests oxidizing agents, such as a peroxide, e.g. hydrogen peroxide, are needed to convert the sulfur species into water soluble sulfoxides or sulfones which can be extracted from the hydrocarbon.

Future gasoline specifications in the United States require sulfur compounds to be reduced to very low levels. The levels are low enough that gasoline blend components such as butanes containing sulfur compounds will make the finished gasoline fail sulfur limits. Refiners desire to limit their capital expenditures and seek alternatives to the building of additional hydrotreating capacity, so they are seeking alternatives to remove these sulfur compounds from their distillates.

It would be desirable to remove sulfur compounds from refinery distillate streams using an alternative process to those presently in use.

SUMMARY

There is provided in one non-limiting embodiment a method for removing a sulfur compound from a hydrocarbon stream containing the sulfur compound. The method comprises contacting the hydrocarbon stream with an amount of a basic ionic liquid effective to react with the sulfur compound to form at least one reaction product in a treated hydrocarbon stream. The basic ionic liquid comprises a quaternary ammonium compound having the formula $R_4N^+ X^-$ or $X^- R_3N^+R'N^+R_3 X^-$, where R is independently an alkyl group, an alkylbenzyl group, a hydroxyalkyl group, or a hydroxyalkylbenzyl group, and R is straight or branched and has 1 to 22 carbon atoms, R' is a straight or branched alkylene or oxyalkylene having 1 to 10 carbon atoms, and where $X^-$ may be, but is not necessarily limited to, hydroxide, carbonate, alkylcarbonate, bicarbonate or alkoxide, where the alkyl group of the alkylcarbonate or alkoxide, if present, is straight or branched and has 1 to 8 carbon atoms.

DETAILED DESCRIPTION

It has been discovered that treatment of hydrocarbons, particularly refinery distillates, with basic ionic liquids (ILs), results in the reduction of the sulfur compounds such as $H_2S$ and/or mercaptans that are present to give easily removed sulfides. These sulfides may be removed by known techniques. It has been discovered that in some cases the sulfur-containing compounds removed include thiophenes, disulfide, alkyl sulfides as well as the $H_2S$ and mercaptans. The ILS appear to have a good solvency for sulfur compounds so these materials are removed into the ILS solution even if the sulfur compound is not particularly acidic. Originally it was thought that the ILS were simply strong bases that could remove sulfur compounds, however continued testing has shown they can remove non-acidic sulfur like a thiophene too.

It should also be understood that the term "removed" also includes methods where $H_2S$/mercaptans are removed from the hydrocarbon but the total sulfur content of the hydrocarbon is not reduced. That is, the reaction products of the ILS stay in the hydrocarbon. The treatment reacts the basic ILs with hydrogen sulfide ($H_2S$) or low molecular weight mercaptans to give products that can then be extracted from the distillate with caustic solutions, hydrogen sulfide or mercaptan scavengers or solid absorbents such as clay or activated carbon or liquid absorbents, such as amine-aldehyde condensates and aqueous aldehydes. Where the method includes extraction, the extraction may be into the IL solution itself, or the sulfur compounds may be extracted by a second treatment with additional IL, water, caustic, clay, and the like. It was found that the ILs are especially active when formulated in methanol as methanol appears to make the ILs an especially good solution to extract all types of sulfur compounds from the hydrocarbon. In one expected non-restrictive practice, the basic ionic liquid is injected into the distillate in any convenient flow line. Alternatively, contacting the hydrocarbon stream with the basic ionic liquid is conducted as an extraction by passing the hydrocarbon stream through the basic ionic liquid in a contact tower. Good mixing of the basic ionic liquid with the distillate is helpful to facilitate reaction and additionally there may be a downstream separation point to remove the aqueous solution. Separators, centrifuges or even storage tank bottoms are all adequate to collect the aqueous by-products. Optionally passing the treated and dehydrated hydrocarbon through a subsequent filtration or in contact with a solid or liquid absorbent (in non-limiting embodiments, clays, carbon, zeolites, amine-aldehyde condensates and the like) removes any residual basic ionic liquid and the reaction product yielding lower sulfur content distillate able to meet all sales specifications. Alternatively, the separation could also be accomplished using an extraction technique such as a contact tower or caustic wash unit. As will be explained in more detail, the additives in addition to being formulated in water could be formulated in an alcohol or other solvent that is not soluble in the hydrocarbon being treated. It has been discovered that the ILS often help this separation. Methanol may be soluble in the hydrocarbon but when the methanol is combined with an ionic liquid, it becomes insoluble in the hydrocarbon and two phases form.

In another non-limiting embodiment the basic ionic liquids include, but are not necessarily limited to, quaternary or diquaternary ammonium compound having the formula $R_4N^+X^-$ or $X^- R_3N^+R'N^+R_3 X^-$, where R is independently an alkyl group, an alkylbenzyl group, a hydroxyalkyl group, or a hydroxyalkylbenzyl group, and R is straight or branched and has 1 to 22 carbon atoms, R' is a straight or branched alkylene or oxyalkylene having 1 to 10 carbon atoms and where $X^-$ is chosen from the group hydroxide, carbonate, alkylcarbonate, bicarbonate or alkoxide, where the alkyl group of the alkylcarbonate or alkoxide, if present, is straight or branched and has 1 to 8 carbon atoms. In some non-restrictive versions R may be alkylaryl or aryl. In the definition of $X^-$ where $X^-$ is alkyloxide or alkylcarbonate, the alkyl group may in particular be methyl, ethyl, or n-butyl, in a particular non-limiting embodiment.

It will be appreciated that the term "ionic liquid" means that the quaternary amine additives are organic salts that are liquid at relatively low temperature. Most salts are solids, but ILs have different properties such as high flash points, good solvency for many other chemicals, and strong basicity if the anion is hydroxide, methoxide, etc.

The basic ionic liquid may further comprise a suitable liquid including, but not necessarily limited to, water, a mono or polyhydric alcohol having 1 to 8 carbon atoms, or an aromatic solvent. Suitable alcohol solvents include, but are not necessarily limited to, methanol, 2-ethylhexyl alcohol, ethanol, 2-propanol, glycerol, ethylene glycol, diethylene glycol, and combinations thereof. Suitable aromatic solvents include, but are not necessarily limited to, toluene, xylenes, Aromatic 100, Aromatic 150 or Aromatic 200 (commercial aromatic solvents), and combinations thereof. In one non-limiting embodiment, the ILs will most likely be formulated with water or an alcohol solvent; they will not often be formulated with both an alcohol and aromatic solvent in the same formulation. The proportion of the quaternary ammonium compound or diquaternary ammonium compound may range from about 10 vol % independently to about 100 vol % of the total IL; alternatively from about 20 vol % independently to about 50 vol %. The word "independently" as used with respect to a range herein means that any lower threshold may be used with any upper threshold to provide a suitable alternative range; in a non-limiting example a suitable alternative range is from about 25 vol % to about 50 vol %.

The basic ILs and the method of using them should have an absence of a surfactant or a soap. There should also be an absence of tetracyclic heterocycles having four nitrogen atoms or reaction products with such tetracyclic heterocycles. Some ILS with certain long alkyl groups can have substantial surfactancy which hurts separation of hydrocarbon and ILS solution. Thus not all ILs are suitable for use in the present method. They have to have low surfactancy. Additionally, in some non-limiting embodiments there is an absence of caprolactam tetrabutyl ammonium bromide ionic liquids.

Suitable sulfur compound-containing refinery distillate streams include, but are not necessarily limited to, liquid or gas hydrocarbons selected from the group consisting of C1 to C12 alkanes, including methane, C2 to C12 alkenes, liquefied petroleum gas, natural gas, fuel gas, flare gas, naphtha, gasoline, kerosene and mixtures thereof; possibly up to C16 for diesel fuels. It will be appreciated that this meaning of "gasoline" includes any component streams, including, but not necessarily limited to, any blend components of the gasoline such as cat cracker gasoline, straight-run gasoline, alkylate, reformate, butanes, and the like conventionally encompassed by the term "gasoline"; e.g. finished gasoline and its blend components. Similarly, the definition of "diesel" includes, but is not necessarily limited to, finished diesel as well as its blend components; e.g. straight-run diesel, kerosene, cat cracker diesel, coker diesel, and the like However, the methods described herein are expected to also be effective in oilfield applications, including, but not necessarily limited to, removing sulfur compounds from oilfield condensates, natural gas, and the like. The methods described herein may also be effective in treating natural gas liquids (NGL) or liquid petroleum gas (LPG) within or as it is withdrawn from a storage facility.

The sulfur compounds that may be removed from the refinery distillate streams include, but are not necessarily limited to, mercaptans having the formula R—S—H where R is a linear or branched C1 to C4 alkyl group, and/or hydrogen sulfide ($H_2S$). If the ILs are used in an application where sulfur is extracted from the hydrocarbon, the types of sulfur compounds removed is much broader and includes thiophenes, thioethers and disulfides.

In more detail, the methods described herein encompass the use of ionic liquids (ILs) as additives which are introduced to a hydrocarbon to scavenge acidic sulfur-containing compounds like $H_2S$ or mercaptans. The additive can be applied like a scavenger where it converts these sulfur compounds into something that no longer is detected as $H_2S$ or mercaptan on the analysis of the treated fuel. In this application, the sulfur compounds formed by the scavenger stay in the hydrocarbon, but are nevertheless defined as "removed" for the purposes of the method described herein. Table I shows this type of performance, in one non-limiting embodiment. It has also been discovered that the ionic liquids alone or in certain solvents like methanol not only scavenge $H_2S$ and mercaptans, but also are capable of extracting the sulfur compounds formed into the ILS solution. Table II shows this type of application. Greater hydrocarbon sulfur reductions are seen than the $H_2S$/mercaptan content of the untreated hydrocarbon leading to the conclusion that additional types of sulfur must be being extracted, for instance compounds like thiophenes as well. Table III presents some additional data to show this performance.

The effective amount of the basic ionic liquid used is any amount that is effective to bind up and/or react with the sulfur compound and at least partially convert it to a reaction product that can be removed. The effective amount will vary depending upon the contact method. In a non-limiting embodiment, the ionic liquid can be an extraction solvent as well as a scavenger. For example, a hydrocarbon stream, such as gasoline, may be passed through a solution of a quat hydroxide (a non-limiting example of the basic ionic liquid) in a contact tower. In this application, there would be a small amount of sour hydrocarbon to a large volume of the quaternary ammonium compound. In one non-limiting embodiment there may be a ratio of 1% hydrocarbon volume to 99% quaternary ammonium compound. In another non-restrictive example, in a laboratory 20 mls of sour gasoline (containing one or more sulfur compounds) may be mixed with an equal volume (20 mls) of ionic liquid (30-50% active quat) in water. The quaternary ammonium compound reacts with the sulfur species in the hydrocarbon and also extracts them into the ionic liquid solution. In this case good mercaptan reduction is observed, but the amount of sulfur removed from the hydrocarbon is greater than the amount of mercaptans in the gasoline so it is apparent that other forms of sulfur are removed as well. Thus, in such an extraction, which may be countercurrent or co-current, the ratio of hydrocarbon volume to quaternary ammonium compound (basic IL) may range from about 1 vol % independently to about 99 vol %; alternatively from about 10 vol % independently to about 50 vol %.

In a different non-limiting embodiment, the method can be practiced by introducing the ionic liquid as an additive, where in a non-restrictive example 1 to 5 ppm of the quaternary ammonium compound is added to the sulfur-compound-containing fuel to scavenge the $H_2S$ and/or mercaptans present. In this case the method is more like a traditional scavenger application where the additive dose is based on the amount of sulfur species to be removed. In this type of application the proportion may be from about 10 ppm of ionic liquid per 1 ppm of $H_2S$ or mercaptan independently to about 1 ppm of ionic liquid per 1 ppm of $H_2S$ or mercaptan. Alternatively, the proportion may be from about 5 ppm of ionic liquid per 1 ppm of $H_2S$ or mercaptan independently to about 1 ppm of ionic liquid per 1 ppm of $H_2S$ or mercaptan.

The temperature range for the contacting by the reducing agent will only be limited by the basic ionic liquid properties. The stream being treated cannot be so hot that the liquid is flashed off. Conversely, the stream cannot be so cold that the basic ionic liquid freezes and does not mix with the hydrocarbon stream. In general, it is expected that relatively hotter will be better than relatively colder since kinetics improve as temperature increases, but again in general, the temperature cannot be so hot that the solvent (e.g. water) flashes off, if present.

In addition to the additives already described, different, optional additives used herein may include other compounds known to be useful in sulfur compound removal methods such as dispersants, defoamers, and the like. Any compound that does not have an undesirable interaction with the basic IL additive's ability to reduce or remove the sulfur compound may be used with at least some embodiment of the methods and compositions described herein. A defoamer in particular might be used if a gas is being treated. Additionally, a demulsifier may be employed if the separation step used involves settling in a storage tank. For instance, there could be some emulsion present that was generated by contact of the aqueous and hydrocarbon phases. A demulsifier will help break the water away from the hydrocarbon.

To reduce the sulfur content of the treated refinery distillate stream, a separation step may be required. The separation can utilize solid absorbents like carbon, clay and zeolites or alternatively the separation can utilize an extraction with caustic solutions. The caustic solution may contain an IL, or the caustic solutions may contain organic solvents like methanol or water. The extraction solvent may be present in a contact tower, settling tank, water/caustic wash vessel, and the like. Small particle size absorbents (powdered carbon vs. carbon pellets) are advantageous in an absorbent. Suitable powders may have a particle size of equal to or less than 0.075 mm, suitable granular sizes may have a particle size of 1.2-1.4 mm and suitable pellets may have a minimum size of 4 mm. The only necessary condition for an extraction solvent is that it should have a pH of neutral or basic (i.e. equal to or greater than 7.0). Suitable clays include, but are not necessarily limited to, attapulgite, montmorillonite, bentonite, and the like.

As noted, removing the reaction products from the treated refinery distillate stream may include any method known to those skilled in the relevant art, such as by using a clay and/or carbon. The use of carbon, such as activated carbon, carbon powder, granulated carbon, other particulate carbon, is a consideration for the separation step because it has been discovered that more sulfur can be removed by carbon when the hydrocarbon has been treated with the basic ionic liquid described herein. Without being limited to any specific explanation, this may be because the basic ionic liquid modifies the sulfur compounds present such that they are better removed by absorption on the carbon media. In the present method, the sulfur compounds are modified before contact with the carbon and the result is that even the modified carbon can absorb more of the sulfur species produced with the basic ionic liquids described herein. The amount of absorbent needed will vary depending on the type of sulfur compounds being removed. Some sulfur compounds with large "R" groups, i.e. alkyl groups, for example will take up more space on the carbon than sulfur compounds with small "R" groups. The overall capacity of the absorbent will depend on the amount of each sulfur compound present in the hydrocarbon refinery distillate stream being treated.

With respect to the optional liquid absorbents to remove the reaction products formed by the treatment with the basic ionic liquids, suitable amine-aldehyde condensates include, but are not necessarily limited to monoethanolamine (MEA) triazines, methylamine (MA) triazines. Suitable aqueous aldehyde solutions include, but are not necessarily limited to, glyoxal, glycolaldehyde, glutaraldehyde and the like. The amount of liquid absorbent may range from about 1 independently to about 90% by volume of hydrocarbon being treated; alternatively from about 10 independently to about 50% by volume of the hydrocarbon being treated. Contacting the hydrocarbon with just the caustic solution works well, but the capacity to extract the reaction products formed in the hydrocarbon is limited. Mixing of the caustic in this step with methanol, glycols etc. as described earlier can give higher sulfur removal rates than only using aqueous caustic alone. The only requirement is the material extracting the sulfur from the hydrocarbon must be largely insoluble in the fuel so that it is not lost to the hydrocarbon in the extraction. This leads to a high replacement rate of the additive if only the caustic solution alone is used. The reaction products such as mercaptide ions may stay in the treated hydrocarbon as the caustic/hydrocarbon solution separates. It should be noted that not all liquid absorbents work. Inorganic oxidizers such as ferric chloride and simple neutralizing amine, such as methyldiethanolamine, have been tried and they do not work.

The process described herein also has the potential to remove higher mercaptans which current scavengers do not remove. Thus, higher boiling fractions can be treated to remove these corrosive materials using this method.

The following examples are provided to illustrate the present method. The examples are not intended to limit the scope of the present method and they should not be so interpreted. Amounts are in weight parts or weight percentages unless otherwise indicated.

$H_2S$/Mercaptan Scavenger Test Procedure for Examples 1-13

The test conditions were as follows: Stock sour ISOPAR™ M from Exxon-Mobil Chemicals (e.g. hydrocarbon stream) was added to 50 mL samples of ISOPAR containing 100 ppm (active) scavenger. Samples were stored at room temperature for the designated period and then analyzed by UOP 163 test method (titration with $AgNO_3$) for liquid sulfide/mercaptan content. The results are presented in Table I. The conventional $H_2S$/mercaptan scavengers in Examples 2, 3, and 4, are 40 vol % glyoxal in water, butyraldehyde MEA condensate in kerosene, MEA triazine in water, respectively. NR stands for no results. Note that "EtSH" is an abbreviation for ethanethiol.

TABLE 1

H₂S/Mercaptan Savenger Evaluation - Test Results

| Ex. | Commercial scavenger or Cation $R_4N^+$ | Anion $X^-$ | $H_2S$ (ppm 24 hrs) | EtSH (ppm 24 hrs) | $H_2S$ (ppm 72 hrs) | H2S (ppm 72 hrs) |
|---|---|---|---|---|---|---|
| 1 | Untreated/control | | 5 | 130 | 32 | 58 |
| 2 | 40% glyoxal in water | | | | | 40 |
| 3 | butyraldehyde MEA condensate in kerosene | | | | | 28 |
| 4 | MEA triazine in water | | | | | 27 |
| 5 | Coco $(CH_3)_2(CH_2CH_2OH)N^+$ | $OH^-$ | 0 | 61 | 18 | 36 |
| 6 | $(n\text{-}Bu)_4N^+$ | $OH^-$ | 0 | 0 | 15 | 21 |
| 7 | $(n\text{-}Bu)_3CH_3N^+$ | $CH_3CO_3^-$ | 0 | 112 | 22 | 24 |
| 8 | Coco $(CH_3)_3N^+$ | $OH^-$ | 0 | 27 | 19 | 26 |
| 9 | $(C_6H_5CH_2)(CH_3)_3N^+$ | $OH^-$ | 0 | 5 | 12 | 30 |
| 10 | Coco $(CH_3)_3N^+$ | $CH_3CO_3^-$ | 0 | 119 | 27 | 33 |
| 11 | $(Et)_4N^+$ | $HCO_3^-$ | 31 | 118 | 23 | 37 |
| 12 | $(C_{12}H_{25})(CH_3)_3N^+$ | $OH^-$ | 0 | 9 | 21 | NR |
| 13 | $Coco_2(CH_3)_2N^+$ | $OH^-$ | 0 | 65 | 21 | NR |

From the results of Table I it may be understood that several of the ILs performed better than current commercial additives, namely the IL of Example 5 that is different from those described herein, the MEA triazine of Example 4, and the glyoxal of Example 2.

In general, ILs with shorter chain alkyl groups and hydroxide anions performed best as both $H_2S$ and mercaptan scavengers. Hydroxide-based ILs are good additive candidates whenever mercaptan removal is desired.

The activity of ILs based on carbonates is significant. As shown, if hydroxides are used in treatment of materials containing $CO_2$, a carbonate would be formed, but as shown in the test data, carbonates are also good scavengers—just relatively slower reacting. Hydroxides could be used in many $H_2S$ scavenger applications where $CO_2$ is present in contrast to caustics where scale formation occurs.

Carbonates are selective in removing $H_2S$, whereas mercaptan removal is less efficient.

The titration data suggested that the following chemistry was operative and may be one reason shorter alkyl groups had better activity than longer alkyl groups:

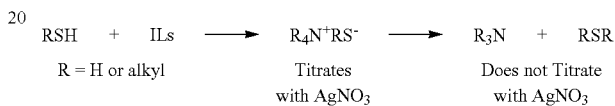

$$\text{RSH} + \text{ILs} \longrightarrow R_4N^+RS^- \longrightarrow R_3N + RSR$$

R = H or alkyl, Titrates with $AgNO_3$, Does not Titrate with $AgNO_3$

Presented in Tables II and III below are additional data where a sour hydrocarbon was shaken with the ionic liquid in water, and the amount of reduction in total sulfur content of the hydrocarbon was measured. The treated hydrocarbon in all Examples 14-25 was gasoline. Gasoline samples were treated by shaking 1:1 volumes of fuel/scavenger for 30 minutes at room temperature, letting samples settle/separate for 30 minutes and then the upper hydrocarbon phase was analyzed for total sulfur content. With the exception of the di-quat hydroxide which was prepared in the laboratory, the ionic liquid solutions tested were commercially available strengths formulated in water. It may be seen from Table II that the quaternary ammonium compound ILs of the present method reduced the sulfur content of the gasoline.

TABLE II

H₂S/Mercaptan Scavenger Evaluation Test Results for Examples 14-19

| Ex. | Cation | Anion | Ionic Liquid Solvent/% active | Total Sulfur Content (ppm) | Comments |
|---|---|---|---|---|---|
| 14 | Untreated | Untreated | None | 38.86, 38.09 (repeat test) | Mercaptan content = 24.79 ppm |
| 15 | $(CH_3)_4N^+$ | $OH^-$ | Water/25% | 14.59 | |
| 16 | $(CH_3CH_2)_4N^+$ | $OH^-$ | Water/35% | 17.45, 12.89, 12.18 (repeat test) | Mercaptan content = 4.50 ppm |
| 17 | $(CH_3CH_2CH_2CH_2)_4N^+$ | $OH^-$ | Water/55% | 15.02 | |
| 18 | Benzyl $(CH_3)_3N^+$ | $OH^-$ | Water/20% | 19.57 | |
| 19 | $Coco(CH_3)_2N^+CH_2CH_2O\text{---}CH_2CH_2N^+(CH_3)_2Coco$ | 2 $OH^-$ | Water/35% | 23.80 | Di-quat hydroxide additive |

TABLE III

H₂S/Mercaptan Scavenger Evaluation Test Results for Examples 20-25

| Ex. | Scavenger | mls Scavenger | Added Solvent (volume) | Total Sulfur Content (ppm) |
|---|---|---|---|---|
| 20 | Untreated Gasoline | none | none | 38.86 |
| 21 | 25% TMAH in water | 50 | none | 14.59 |
| 22 | 25% TMAH in water | 25 | MeOH (25 mls) | 14.06 |
| 23 | 25% TMAH in MeOH (no water) | 50 | none | 7.72 |
| 24 | 35% TEAH in water | 50 | none | 17.45 |
| 25 | 35% TEAH in water | 25 | MeOH (25 mls) | 11.96 |

The Examples 20-25 of Table III were conducted by shaking 50 mls of scavenger solution with 50 ml of gasoline for 15 minutes, allowing the phases to separate and then analyzing the hydrocarbon phase for sulfur content. For example, 50 mls of the 25% active tetraethylammonium hydroxide (TMAH) in water was shaken with 50 mls of gasoline and the sulfur content of the hydrocarbon was found to be reduced from 38.86 ppm to 14.59 ppm after separation of the two phases. When a mixture of only 25 mls of 25% aqueous TMAH and 25 mls of methanol was shaken with 50 mls of gasoline the sulfur content of the separated hydrocarbon was reduced from 38.86 ppm to 14.06 ppm. A slightly better extraction of the sulfur compounds from the gasoline was obtained even though only half as much scavenger was used. The presence of methanol did help the performance of the ILs.

In the foregoing specification, the invention has been described with reference to specific embodiments thereof, and has been demonstrated as effective in providing configurations, methods, and compositions for removing sulfur compounds from hydrocarbon streams, particularly refinery distillate streams containing them, for instance as demonstrated in the results of Tables I and II. However, it will be evident that various modifications and changes can be made thereto without departing from the broader scope of the invention as set forth in the appended claims. Accordingly, the specification is to be regarded in an illustrative rather than a restrictive sense. For example, the type of refinery distillate streams, the amounts and ratios of ionic liquids, quaternary ammonium compounds, solvents, reaction products, sulfur compounds, treatment procedures, reaction parameters, solid absorbents, liquid absorbents, and other components and/or conditions falling within the claimed parameters, but not specifically identified or tried in a particular method, are expected to be within the scope of this invention. Further, it is expected that the method may change somewhat from one application to another and still accomplish the stated purposes and goals of the methods described herein.

The present invention may suitably comprise, consist or consist essentially of the elements disclosed and may be practiced in the absence of an element not disclosed. For instance, there may be provided a method for removing a sulfur compound from a hydrocarbon stream containing the sulfur compound, where the method consists essentially of or consists of contacting the hydrocarbon stream with an amount of a basic ionic liquid effective to react with the sulfur compound to form at least one reaction product in a treated hydrocarbon stream and removing the at least one reaction product from the treated hydrocarbon stream. The basic ionic liquid in this method may comprise, consist essentially of, or consist of a quaternary ammonium compound having the formula $R_4N^+ X^-$ or $X^- R_3N^+R'N^+R_3 X^-$, where R is independently an alkyl group, an alkylbenzyl group, a hydroxyalkyl group, or a hydroxyalkylbenzyl group, and R is straight or branched and has 1 to 22 carbon atoms, R' is a straight or branched alkylene or oxyalkylene having 1 to 10 carbon atoms, and where $X^-$ is chosen from the group hydroxide, carbonate, alkylcarbonate, bicarbonate or alkoxide, where the alkyl group of the alkylcarbonate or alkoxide, if present, is straight or branched and has 1 to 8 carbon atoms.

As used herein, the terms "comprising," "including," "containing," "characterized by," and grammatical equivalents thereof are inclusive or openended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method for removing a sulfur compound from a hydrocarbon stream containing the sulfur compound, the method comprising:
    contacting the hydrocarbon stream with an amount of a basic ionic liquid effective to react with the sulfur compound to form at least one reaction product in a treated hydrocarbon stream; where:
the basic ionic liquid comprises a quaternary ammonium compound having the formula $R_4N^+ X^-$ or $X^- R_3N^+R'N^+R_3 X^-$, where R is independently an alkyl group, an alkylbenzyl group, a hydroxyalkyl group, or a hydroxyalkylbenzyl group, and R is straight or branched and has 1 to 22 carbon atoms, R' is a straight or branched alkylene or oxyalkylene having 1 to 10 carbon atoms, and where $X^-$ is selected from the group consisting of hydroxide, carbonate, alkylcarbonate, bicarbonate or alkoxide, where the alkyl group of the alkylcarbonate or alkoxide, if present, is straight or branched and has 1 to 8 carbon atoms.

2. The method of claim 1 where the basic ionic liquid further comprises a liquid selected from the group consisting of water, a monohydric or polyhydric alcohol having 1 to 8 carbon atoms, and an aromatic solvent.

3. The method of claim 1 where contacting the hydrocarbon stream with the basic ionic liquid is conducted as an extraction by passing the hydrocarbon stream through the basic ionic liquid in a contact tower.

4. The method of claim 3 where contacting the hydrocarbon stream with the basic ionic liquid is conducted by contacting from about 1 vol % to about 99 vol % of the hydrocarbon stream with the basic ionic liquid.

5. The method of claim 1 where contacting the hydrocarbon stream with the basic ionic liquid is conducted by adding the basic ionic liquid to the hydrocarbon stream, where the effective amount of the basic ionic liquid ranges from about 10 ppm of the basic ionic liquid per 1 ppm of the sulfur compound to about 1 ppm to about 1 ppm of the sulfur compound.

6. The method of claim 1 where hydrocarbons in the hydrocarbon stream range from C1-C12.

7. The method of claim 1 where hydrocarbons in the hydrocarbon stream are selected from the group consisting of gasoline, diesel, kerosene, liquefied petroleum gas, natural gas, fuel gas, flare gas, naphtha, diesel fuels, and combinations thereof.

8. The method of claim 1 where when $X^-$ is carbonate, it is selected from the group consisting of carbonate, alkylcarbonate, and bicarbonate.

9. The method of claim 1 where the sulfur compound selected from the group consisting of hydrogen sulfide, thiophenes, disulfides, thioethers, mercaptans, and combinations thereof.

10. A method for removing a sulfur compound from a hydrocarbon stream containing the sulfur compound, the method comprising:
contacting the hydrocarbon stream with an amount of a basic ionic liquid effective to react with the sulfur compound to form at least one reaction product in a treated hydrocarbon stream; where:
the basic ionic liquid comprises:
a quaternary ammonium compound having the formula $R_4N^+ \ X^-$ or $X^- \ R_3N^+R'N^+R_3 \ X^-$, where R is independently an alkyl group, an alkylbenzyl group, a hydroxyalkyl group, or a hydroxyalkylbenzyl group, and R is straight or branched and has 1 to 22 carbon atoms, R' is a straight or branched alkylene or oxyalkylene having 1 to 10 carbon atoms, and where $X^-$ is selected from the group consisting of hydroxide, carbonate, alkylcarbonate, bicarbonate or alkoxide, where the alkyl group of the alkylcarbonate or alkoxide, if present, is straight or branched and has 1 to 8 carbon atoms; and
a liquid selected from the group consisting of water, a monohydric or polyhydric alcohol having 1 to 8 carbon atoms, and an aromatic solvent;
where hydrocarbons in the hydrocarbon stream range from C1-C12.

11. The method of claim 10 where contacting the hydrocarbon stream with the basic ionic liquid is conducted as an extraction by passing the hydrocarbon stream through the basic ionic liquid in a contact tower.

12. The method of claim 11 where contacting the hydrocarbon stream with the basic ionic liquid is conducted by contacting from about 1 vol % to about 99 vol % of the hydrocarbon stream with the basic ionic liquid.

13. The method of claim 10 where contacting the hydrocarbon stream with the basic ionic liquid is conducted by adding the basic ionic liquid to the hydrocarbon stream, where the effective amount of the basic ionic liquid ranges from about 10 ppm of the basic ionic liquid per 1 ppm of the sulfur compound to about 1 ppm to about 1 ppm of the sulfur compound.

14. The method of claim 10 where the sulfur compound selected from the group consisting of hydrogen sulfide thiophenes, disulfides, thioethers, mercaptans, and combinations thereof.

15. A method for removing a sulfur compound selected from the group consisting of hydrogen sulfide thiophenes, disulfides, thioethers, mercaptans, and combinations thereof from a hydrocarbon stream containing the sulfur compound, the method comprising:
contacting the hydrocarbon stream with an amount of a basic ionic liquid effective to react with the sulfur compound to form at least one reaction product in a treated hydrocarbon stream; where:
the basic ionic liquid comprises a quaternary ammonium compound having the formula $R_4N^+ \ X^-$ or $X^- \ R_3N^+R'N^+R_3 \ X^-$, where R is independently an alkyl group, an alkylbenzyl group, a hydroxyalkyl group, or a hydroxyalkylbenzyl group, and R is straight or branched and has 1 to 22 carbon atoms, R' is a straight or branched alkylene or oxyalkylene having 1 to 10 carbon atoms, and where $X^-$ is selected from the group consisting of hydroxide, carbonate, alkylcarbonate, bicarbonate or alkoxide, where the alkyl group of the alkylcarbonate or alkoxide, if present, is straight or branched and has 1 to 8 carbon atoms;
contacting the hydrocarbon stream with the basic ionic liquid is conducted by a method selected from the group consisting of:
as an extraction by passing the hydrocarbon stream through the basic ionic liquid in a contact tower; and
contacting the hydrocarbon stream with the basic ionic liquid is conducted by adding the basic ionic liquid to the hydrocarbon stream.

16. The method of claim 15 where the basic ionic liquid further comprises a liquid selected from the group consisting of water, a monohydric or polyhydric alcohol having 1 to 8 carbon atoms, and an aromatic solvent.

17. The method of claim 15 where contacting the hydrocarbon stream is conducted by extraction, and where the extraction is conducted by contacting from about 1 vol % to about 99 vol % of the hydrocarbon stream with the basic ionic liquid.

18. The method of claim 15 where contacting the hydrocarbon stream with the basic ionic liquid is conducted by adding the basic ionic liquid to the hydrocarbon stream, where the effective amount of the basic ionic liquid ranges from about 10 ppm of the basic ionic liquid per 1 ppm of the sulfur compound to about 1 ppm to about 1 ppm of the sulfur compound.

19. The method of claim 15 where hydrocarbons in the hydrocarbon stream range from C1-C12.

20. The method of claim 15 where hydrocarbons in the hydrocarbon stream are selected from the group consisting of gasoline, diesel, kerosene, liquefied petroleum gas, natural gas, fuel gas, flare gas, naphtha, diesel fuels, and combinations thereof.

* * * * *